(12) United States Patent
Vermillion et al.

(10) Patent No.: US 7,634,323 B2
(45) Date of Patent: Dec. 15, 2009

(54) OPTIMIZATION-BASED MODULAR CONTROL SYSTEM

(75) Inventors: Christopher R. Vermillion, Ann Arbor, MI (US); Jing Sun, Ann Arbor, MI (US); Ken R. Butts, Grosse Pointe Woods, MI (US)

(73) Assignees: Toyota Motor Engineering & Manufacturing North America, Inc., Erlanger, KY (US); The Regents of the University of Michigan, Ann Arbor, MI (US)

( * ) Notice: Subject to any disclaimer, the term of this patent is extended or adjusted under 35 U.S.C. 154(b) by 160 days.

(21) Appl. No.: 11/678,310

(22) Filed: Feb. 23, 2007

(65) Prior Publication Data

US 2008/0208371 A1 Aug. 28, 2008

(51) Int. Cl.
*G05B 13/02* (2006.01)
(52) U.S. Cl. .............................. 700/29; 700/44; 700/45
(58) Field of Classification Search ...................... 700/1, 700/20, 27–29, 32–34, 36, 38, 41, 42, 44, 700/45
See application file for complete search history.

(56) References Cited

U.S. PATENT DOCUMENTS

| 5,682,309 | A | 10/1997 | Bartusiak et al. |
| 6,216,083 | B1 | 4/2001 | Ulyanov et al. |
| 7,006,900 | B2 * | 2/2006 | Zhenduo et al. ............... 700/29 |
| 7,111,450 | B2 | 9/2006 | Surnilla |
| 7,363,094 | B2 * | 4/2008 | Kumar ......................... 700/29 |
| 2004/0098145 | A1 * | 5/2004 | Zhenduo et al. ............... 700/42 |
| 2006/0185626 | A1 | 8/2006 | Allen et al. |
| 2006/0196451 | A1 | 9/2006 | Braun et al. |
| 2006/0282177 | A1 | 12/2006 | Fuller et al. |
| 2007/0016356 | A1 | 1/2007 | Kolb et al. |

* cited by examiner

*Primary Examiner*—Charles R Kasenge
(74) *Attorney, Agent, or Firm*—Gifford, Krass, Sprinkle, Anderson & Citkowski, P.C.

(57) ABSTRACT

A system for controlling a plant process wherein the plant is over-actuated with N+1 actuators and provides N performance variables is disclosed. The system includes an outer-loop controller operable to compare N performance variable values from the plant with a reference set point and provide a desired virtual control input to an inner-loop controller. The inner-loop controller receives the desired virtual control input from the outer-loop controller and provides real control inputs to the at least N+1 actuators. The N+1 actuators receive the real control inputs and subsequently provide an actual virtual control input to the plant. Upon receiving the actual virtual control input from the N+1 actuators the plant is operable to produce N updated performance variable values in an optimized manner.

17 Claims, 3 Drawing Sheets

OPTIMIZATION-BASED MODULAR CONTROL SYSTEM

FIELD OF THE INVENTION

This invention relates generally to a control system for an automotive plant. More specifically, the invention relates to an inner-loop/outer-loop control system for an automotive plant process.

BACKGROUND OF THE INVENTION

In order to meet performance, efficiency, emission and other possible requirements over a wide range of operating conditions and environments, an automotive system may have more input variables than output variables. The input variables to a plant, controlled using actuators, are used to control the output variables of the plant process. For example, a conventional gasoline engine will have at a minimum, throttle, spark advance and fuel inputs in order to control the speed and/or the air/fuel ratio of the engine. In more advanced engines, variable valve timing (VVT) and continuously variable transmissions (CVTs) represent additional control inputs that may be applied to a plant.

The excess of inputs, and thus excess of actuators, is desirable in attempting to improve performance, efficiency, and the lice. And although these features of a control system may not be reflected through variables that are controlled to a specific set point the features are important with respect to obtaining the best operation of an engine or plant.

Over-actuated systems can be found in vehicle power train systems, vehicle stability control systems, modern aircraft and robotic systems. However, a cost effective and practical control system, method of design and/or strategy that optimizes an overall force, moment or generalized effect using actuators of the system is lacking. Therefore, a control system for over-actuated systems in which the individual features of the various actuators are incorporated to provide optimized inputs to a plant is desirable.

SUMMARY OF THE INVENTION

A system for controlling a plant process wherein the plant is over-actuated with N+1 actuators and manipulates N performance variables is disclosed. The system includes an outer-loop controller operable to compare values of N performance variables from the plant with a reference set point and provide a desired virtual control input to an inner-loop controller. The inner-loop controller receives the desired virtual control input from the outer-loop controller and provides real control inputs to the at least N+1 actuators. The N+1 actuators receive the real control inputs and subsequently provide an actual virtual control input to the plant. Upon receiving the actual virtual control input from the N+1 actuators the plant is operable to produce updated values of the N performance variables in an optimized manner.

DETAILED DESCRIPTION OF THE INVENTION

The present invention discloses a system for controlling a plant process wherein an over-actuated plant with at least N+1 actuators provides N performance variables in an optimized manner. As such, the present invention has utility in affording an optimized operation of a plant.

Figure 1:
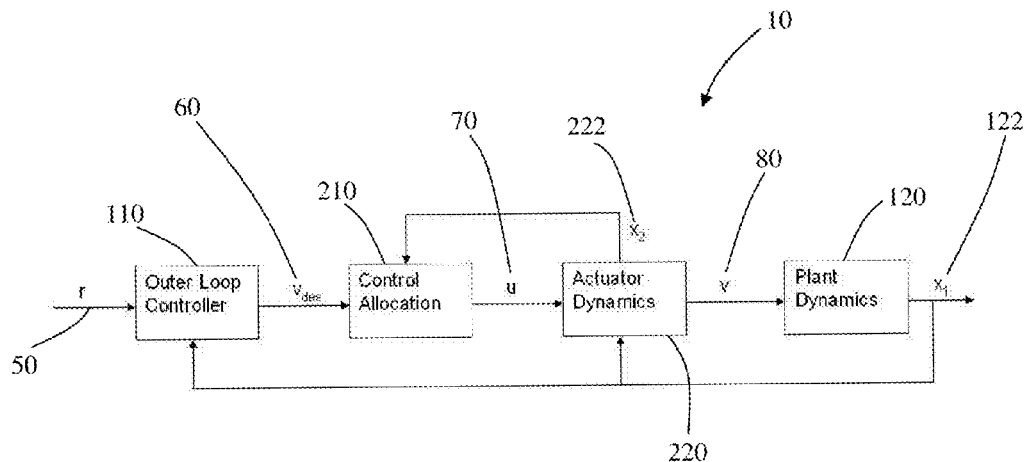
FIG. 1 is a block diagram illustrating one embodiment of the present invention.

A block diagram for one embodiment of the present invention is shown in FIG. 1. The control system illustrated generally at 10 includes an outer-loop controller 110, a control allocation feature 210, actuator dynamics 220, and plant dynamics 120. Although not shown in the figure, actuators are included within the actuator dynamics block 220 and a plant is included within the plant dynamics block 120. By definition, an over-actuated system or plant has more inputs than outputs. As such, the plant has a positive number of degrees of freedom and the inputs can be optimized with respect to an overall goal, set point and/or constraint of the plant process.

The outer-loop controller 110 is supplied with a reference set point 50. The reference set point 50 is commonly referred to as "r" and is known by those skilled in the art as a specific value, or a trajectory of values as a function of time, to which a performance variable is to be regulated. The reference set point 50 can be stored on and retrieved from an electronic device, illustratively including a separate microcontroller (not shown), a microcontroller within the outer-loop controller 110 and combinations thereof. In the alternative, the reference set point 50 can be provided in real time by an operator. A performance variable is a variable produced by a plant that a user, designer and/or manufacturer ultimately desires to regulate.

The outer-loop controller 110 can also measure a performance variable 122 from the plant 120 and affords for the comparison of the reference set point 50 and the performance variable 122. Based on this comparison, the outer-loop controller 110 can generate and/or provide a desired virtual control input 60 ($v_{des}$) to the control allocation feature 210, also known as an inner-loop controller. For purposes of the present invention, virtual control input is defined as a generalized force, moment, or overall effect that all of the actuators of a given system are aimed at providing. Therefore, the desired virtual control input 60 is a desired generalized force, moment, or overall effect that all of the actuators of a given system are desired to provide. For example, for a motor vehicle to produce a performance variable of speed, a desired virtual control input of torque can be supplied to the control allocation feature 210 based on the constraints of fuel efficiency, vehicle emissions, acceleration and/or deceleration rate, and the like.

The outer-loop controller 110 can be comprised of any controller known to those skilled in the art, illustratively including a proportional integral controller with integrator anti-windup, model reference controller, H-infinity controller and the like. In addition, the outer-loop controller and the inner-loop controller can be located within the same microcontroller, microprocessor, computer and the like. In the alternative, an outer-loop controller and an inner-loop controller can be located on separate microcontrollers, microprocessors, computers and the like. If the outer-loop and inner-loop controllers are located separately, the communication between controllers can be performed using any electronic communication means known to those skilled in the art, illustratively including a controller area network (CAN) bus and/or wireless networks.

Upon receiving the desired virtual control input 60, the control allocation feature 210 generates and/or provides real control inputs 70 ($u$) to the actuators within the actuator dynamics block 220. Preferably, the control allocation feature 210 includes model predictive control allocation (MPCA) wherein an optimal trajectory of control inputs is computed with reference to a dynamic model, in real time, over a receding horizon. This computation preferably minimizes a cost function. One example of such a computation includes: (1) at time t=0, the MPCA computes a trajectory of control inputs over the next ten seconds; (2) the first step of the MPCA trajectory is implemented; (3) at the next sample time, e.g. t=Δt, the performance variable 122 at Δt is measured; (4) the performance variable 122 at Δt is supplied to the outer-loop controller 110; (5) the outer-loop controller 110 computes and/or provides a new desired virtual control input 60 to the control allocation feature 210; and (6) the control allocation feature 210 using MPCA computes a new optimal trajectory of control inputs, and the cycle repeats. In this manner, the MPCA affords the control allocation feature 210 to consider the dynamics of the actuators in real time by evaluating candidate control input trajectories over a receding horizon.

As stated above, a cost function is preferably minimized in order to provide the optimal trajectory of control inputs over the receding horizon. Such a cost function can take the form:

$$J(x_2(0), u) = \sum_{i=1}^{N} (v(i) - v_{des}(i))^2 + P(x_2(i), u_i) \qquad \text{Eqn. 1}$$

where $x_2$ represents the actuator states and N in this equation is the number of steps computed, not the number of performance variables referred to above. The first term shown in Equation 1 penalizes any deviation between an actual virtual control input (v) and a desired virtual control input ($v_{des}$), whereas the second term is a performance augmentation that can take any form. For example, the second term can be used to penalize a failure to meet certain criteria, illustratively including fuel efficiency and/or emissions.

Upon minimization of a desired cost function at a given step, the control allocation feature 210 generates, computes and/or provides real control inputs 70 to the actuators in the system. Upon receiving real control inputs 70, the actuators are activated or excited to the proper values of said inputs 70. The resultant effect of the actuators and actuator dynamics 200 is to generate and/or provide an actual virtual control input 80 to the plant. The actuator dynamics 220 shown in FIG. 1 can additionally provide actuator states 222 ($x_2$) to the control allocation feature 210.

Upon receiving the actual virtual control input 80, the plant and plant dynamics 120 produce the performance variable 122 ($x_1$). The performance variable 122 can be provided to the actuator dynamics 220 in addition to the outer-loop controller 110. In this manner, an outer loop containing an outer-loop controller 110 and plant dynamics 120 can provide a desired virtual control input 60 to an inner loop containing a control allocation feature 210 and actuator dynamics 220. It is appreciated that although the performance variable 122 is referred to in the singular form, it is within the scope of the present invention for the plant and plant dynamics 120 to produce N performance variables so long as there are at least N+1 actuators.

Figure 2:
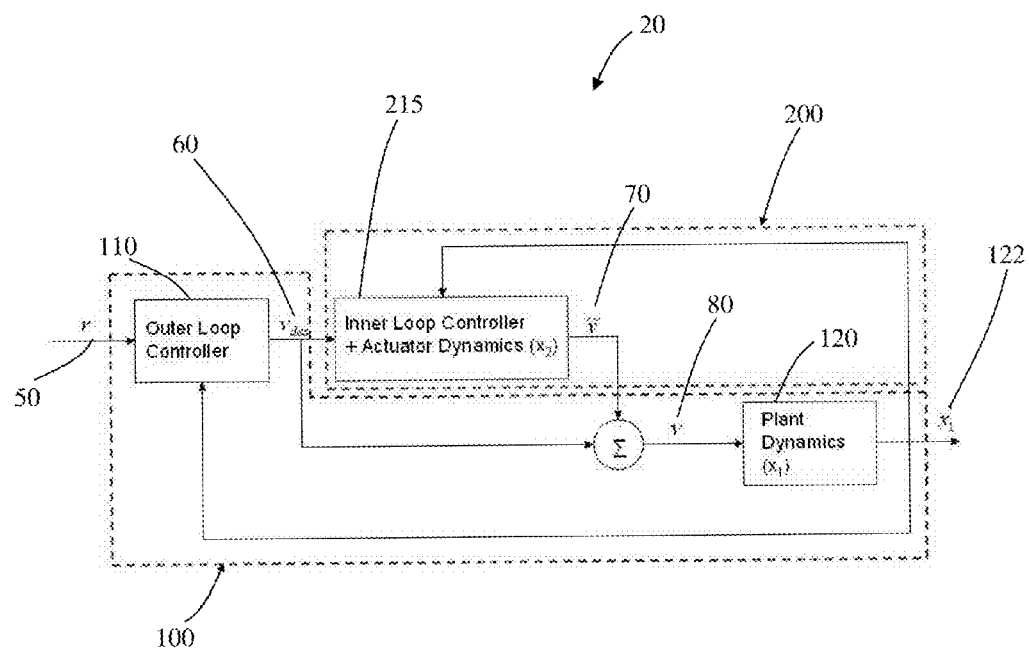
FIG. 2 is a block diagram illustrating a design method for one embodiment of the present invention.

A method for designing a control system of the present invention is illustrated in FIG. 2. Such a design method affords for the separation of development for components and/or system(s) within a particular outer loop and inner loop. The control design procedure involves two steps: (1) design of a suitable outer-loop controller; and (2) selection of an appropriate MPCA cost function.

An outer loop 100 includes the outer-loop controller 110 and plant dynamics 120. The inner loop 200 includes an timer-loop controller plus actuator dynamics 215 that is equivalent to the control allocation feature 210 and actuator dynamics 220 of FIG. 1. The outer-loop controller 110 affords for the acceptance and comparison of a reference set point 50 with a plant performance variable 122. The outer-loop controller 110, based on this comparison, generates and/or provides a desired virtual control input 60 to the inner loop 200. In this manner, the inner-loop/outer-loop structure of the present invention affords for the outer loop 100 to generate and/or provide a generalized force, moment, or overall effect that all of the actuators of a given system are aimed at providing to a separate and distinct inner loop 200. Thus, using the present invention a plant with an outer-loop controller can be developed separate from the actuators and/or actuator system that will be used to control the plant.

Once the desired virtual control input 60 has been determined by the outer-loop controller 110 and provided to the inner-loop 200, the inner-loop controller plus actuator dynamics 215 accepts said input 60. Thereafter, the inner-loop controller plus actuator dynamics 215 can determine the difference between the actual virtual control input (v) from the previous step and the desired virtual control input ($v_{des}$) of the present step. This difference, $\tilde{v}=v-v_{des}$, also referred to as the error between the actual virtual control input and the desired virtual control input, enters the outer loop as a disturbance input. Providing the desired virtual control input 60 to the inner loop 200 in this manner affords the outer loop 100 to be designed on the assumption that the actual virtual control input is equal to the desired virtual control input ($v=v_{des}$) for the inner-loop/outer-loop system. This methodology allows for a separation of concerns regarding the development of the inner loop and the outer loop.

It is appreciated that construction of the outer-loop controller can require the desired virtual control input to be in fact reasonable for the actuators to achieve. If this fact is ignored, the difference between the actual virtual control input and the desired virtual control input that enters the outer loop 100 may be large and the stability of the overall system compromised. Attenuation of the effect of the disturbance, $\tilde{v}$, on the performance variable or variables 122, will aid in achieving full-system stability.

The inner loop 200 design requires choosing an appropriate MPCA cost function and constraints placed on the control input trajectory that arise from the cost function. The MPCA is comprised from one or more algorithms that compute a sequence of manipulated variable adjustments in order to optimize the future behavior of the plant dynamics 120. For example, and in no way limiting the scope of the present invention, a cost function such as:

$$J(x_1(0), x_2(0), u) = \sum_{i=1}^{N} (\alpha(v_{des}(i) - v(i))^2 + \frac{\beta^T u_{error,sq}(i)}{1 + |y_{des} - y|} \qquad \text{Eqn. 2}$$

can be used for simulation of MPCA performance regarding a thermal management system, where $$\beta^T = [\beta_1 \ldots \beta_q]^T \qquad \text{Eqn. 3}$$

places weights on the importance of each actuator being at a preferred position, $u_p$, and:

$$u_{error,sp}(i) = [(u_{1,p} - u_1(i))^2 \ldots (u_{q,p} - u_q(i))^2]^T \qquad \text{Eqn. 4}$$

reflects the difference between actual and preferred control inputs. The second term in the cost function shown in Equation 2 is normalized by the magnitude of the tracking error in order to add importance to achieving the preferred actuator settings when the system has reached a desired set point, but reduce that importance during any transients.

In an effort to further illustrate the present invention and yet in no way limit its scope, an example of the application of the present invention is provided below.

Example

Figure 3:
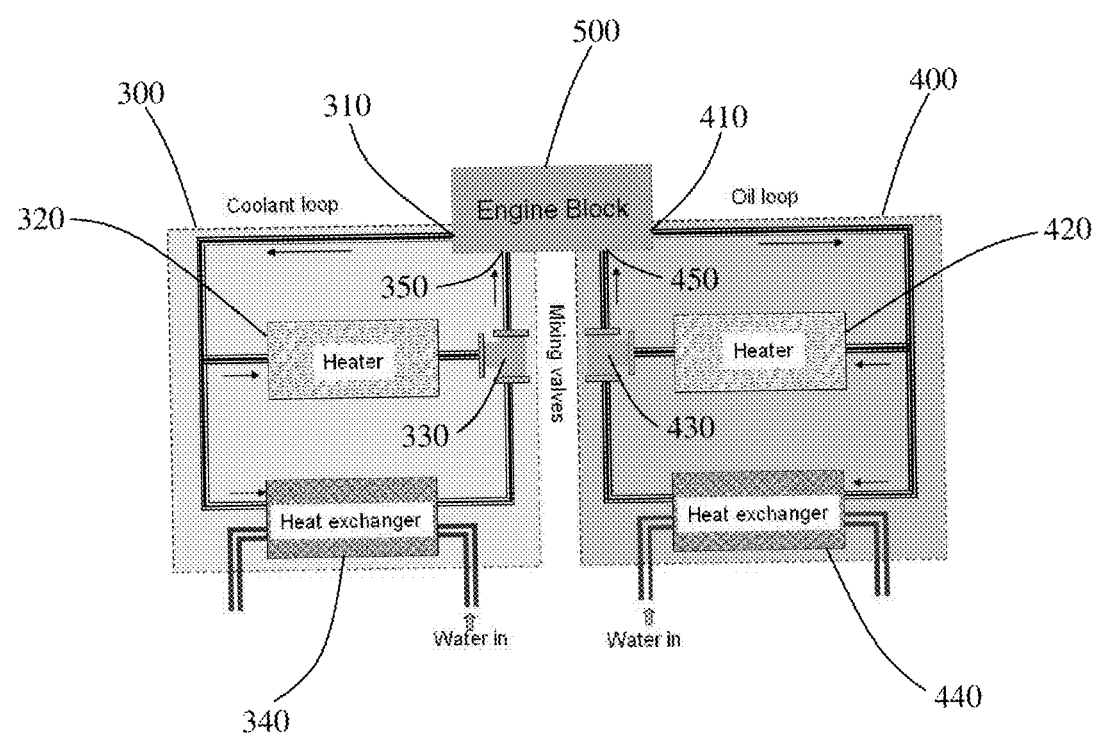
FIG. 3 is a schematic diagram of an over-actuated plant process.

FIG. 3 illustrates an over-actuated plant in the form of a thermal system. The thermal system shown generally at 20 includes a coolant loop 300 and an oil loop 400. Both the coolant loop 300 and oil loop 400 include an engine outlet, 310 and 410 respectively. The coolant loop 300 also includes a heater 320, a mixing valve 330 and a heat exchanger 340. The oil loop 400 includes a heater 420, a mixing valve 430 and a heat exchanger 440. Upon operation of the engine block 500, coolant and oil pass through said block 500 and the various components of the respective loop.

Although different constraints may be placed on the coolant loop 300 and oil loop 400, the engine block 500 will have one engine outlet temperature at engine outlet 310 and engine outlet 410. In addition, the heater 320 and mixing valve 330 serve as actuators to the engine block 500 wherein said components can be used to vary the engine inlet temperature at 350. Likewise, the heater 420 and mixing valve 430 can be used to vary the engine inlet temperature at 450. Thus two actuators, heater 320 and mixing valve 330, can be used to adjust one performance variable of engine outlet temperature at 310. Likewise the two actuators, heater 420 and mixing valve 430 can be used to control performance variable engine outlet temperature at 410. This over-actuation of the system therefore requires control allocation. However, the actuators possess different dynamic authorities in how they affect the system output, in this example, the engine block outlet temperature. In particular, it is known that the mixing valve 330 and mixing valve 430 provide much faster control authority than the heater 320 and heater 420. Therefore, in order to effectively control the entire system, the over-actuation and different dynamic authorities of the actuators must be taken into account. In addition, actuators can exhibit hard saturation limits and should be explicitly considered in arriving at an optimal solution.

In the present example, the system was described with the following equations:

$$x_1(k+1) = f_1(x_1(k), v(k)) \qquad \text{Eqn. 5}$$

$$x_2(k+1) = f_2(x_1(k), x_2(k), u(k)) \qquad \text{Eqn. 6}$$

$$v = g(x_2, u) \qquad \text{Eqn. 7}$$

$$y = h(x_1) \qquad \text{Eqn. 8}$$

where u was a vector of real control inputs, y was the scalar output, and v represented the virtual control input. Each real control input was subject to a hard saturation limit. Using this description, $x_1$ represented the plant states, y represents the performance variables, and $x_2$ represented the actuator states. The states of the plant, $x_1$, consisted of the temperatures of the fluid inside the engine and the temperature of the engine block. The states of the actuators, $x_2$, included the temperatures of the fluid within the heater, heat exchanger and the temperature of the heater coil. The virtual control input was the temperature at the engine inlet.

Referring back to FIG. 1 in light of FIG. 3, the outer-loop controller 110 generated and/or provided a desired virtual control input 60, and the inner-loop controller generated and/or provided the real control inputs 70 that should have achieved a desired virtual control input 60 as closely as possible, while also managing other important system priorities such as fuel efficiency, vehicle stability, and the like. The task of the inner loop 200 shown in FIG. 2 was to provide control allocation. The inner loop used MPCA with an associated cost function that was minimized in order to provide actual virtual control inputs to the plant and plant dynamics 120 such that overall optimization of the system was accomplished.

Figure 4:
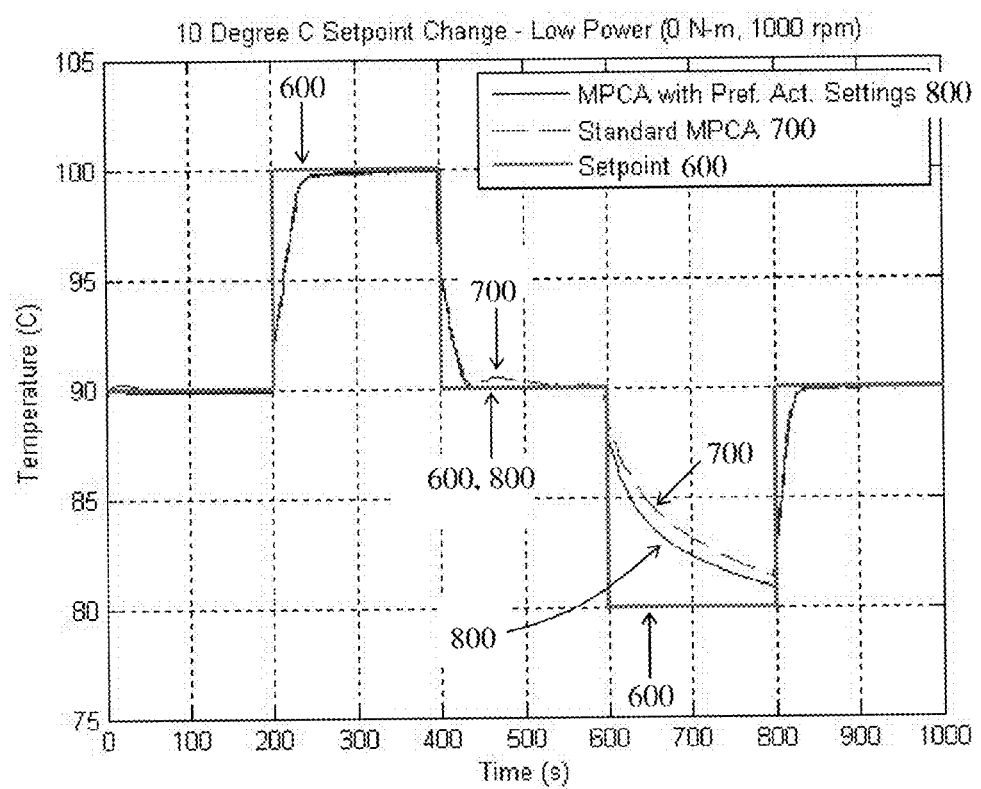
FIG. 4 is a graph illustrating the performance of a plant using the present invention.

Turning to FIG. 4, the above example was simulated with a time trace of the results shown in the graph. The set point 600 was tracked by a standard MPCA control strategy 700 and an MPCA control strategy with preferred actuator settings 800 according to the present invention. As shown by this graph, the MPCA with preferred actuator settings 800 of the present invention provided a more accurate fit or tracking to the set point 300 than the standard MPCA control strategy 700.

The control system disclosed in the present invention provides for an improved method and system to optimize the operation of an engine, plant, and the like. The inner-loop/outer-loop design allows for modulation and separation of the development regarding components within an inner loop and an outer loop. This separation provides utility to designers of automotive systems, aircraft systems, robotic systems and the like.

It is appreciated that a plant subsystem can be defined as a portion of the entire system that can be fully described with input v and output y. In other words, in order to model/simulate the plant subsystem completely, the present invention affords one not to need knowledge of real control inputs, as long as there is full knowledge of the virtual control input. Furthermore, an actuator subsystem can be defined as a portion of the entire system that can be fully described as taking real control inputs, u (and possibly a feedback from the plant), and producing the virtual control input v. It is also appreciated that a division between plant and actuator subsystems can depend on a choice of a virtual control input. For a given system, there can be more than one signal, value, and the like, that can be chosen as the virtual control input. As such, it is preferable to select the virtual control input that lumps or contains the greatest possible amount of the system dynamics for the plant subsystem. For example and for illustrative purposes only, in choosing between a speed or an acceleration for a virtual control input, acceleration would be chosen.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A system for controlling a plant to a reference set point comprising:
    an outer-loop controller receiving said reference set point and a performance variable value from said plant, said outer-loop controller generating a desired virtual control input;
    an inner-loop controller receiving said desired virtual control input from said outer-loop controller and generating a real control input;

at least one actuator receiving said real control input from said inner-loop controller and generating an actual virtual control input;

wherein said plant receives said actual virtual control input from said at least one actuator and generates an updated performance variable value;

said inner-loop controller also minimizing a cost function in real time in order to generate said real control input, said cost function being a function of said desired virtual input and said actual virtual control input; and said at least one actuator provides said plant a disturbance, said disturbance equal to the difference between said actual virtual control input and said desired virtual control input.

2. The system of claim 1, wherein said outer-loop controller compares said reference set point with said performance variable before generating said desired virtual control input.

3. The system of claim 2, wherein said outer-loop controller is selected from the group consisting of a proportional integral controller, a model reference controller, a H-infinity controller and combinations thereof.

4. The system of claim 1, wherein said inner-loop controller uses control allocation to generate said real control input to said at least one actuator.

5. The system of claim 4, wherein said control allocation is dynamic control allocation.

6. The system of claim 5, wherein said dynamic control allocation is model predictive control allocation.

7. The system of claim 6, wherein said model predictive control allocation generates an optimal trajectory of said real control input using a dynamic model.

8. The system of claim 7, wherein said optimal trajectory is generated in real time over a receding horizon, for the purpose of minimizing a cost function.

9. The system of claim 1, wherein said at least one actuator provides an actuator state to said inner-loop controller.

10. The system of claim 1, wherein said outer-loop controller and said plant are within an outer loop.

11. The system of claim 1, wherein said inner-loop controller and said at least one actuator are within an inner loop.

12. The system of claim 1, wherein said plant has N performance variable(s) and said at least one actuators is at least N+1 actuators.

13. An inner-loop/outer-loop control system for controlling a plant process with an over-actuated plant having N performance variable(s) and at least N+1 actuators comprising:

an outer loop with an outer-loop controller and said plant with said N performance variable(s), said outer-loop controller receiving and comparing values of said N performance variable(s) from said plant to a reference set point and generating a desired virtual control input to an inner loop;

said inner loop having at least N+1 actuators and an inner-loop controller, said inner-loop controller using model predictive control allocation and receiving said desired virtual control input, generating an optimal trajectory of real control inputs over a receding horizon and providing an optimum set of real control inputs to said at least N+1 actuators;

said N+1 actuators receiving said optimum set of real control inputs and generating an actual virtual control input to said plant within said outer loop; and said plant receiving said actual virtual control input and generating updated values of said N performance variable(s).

14. The system of claim 13, wherein said at least N+1 actuators provide said plant a disturbance, said disturbance equal to the difference between the actual virtual control input and the desired virtual control input.

15. A method for controlling a plant comprising:

providing an outer-loop controller, the outer-loop controller receiving a reference set point and a performance variable value, comparing the reference set point with the performance variable value and then providing a desired virtual control input;

providing an inner-loop controller, the inner-loop controller receiving the desired virtual control input from the outer-loop controller and providing a real control input;

providing at least one actuator, the at least one actuator receiving the real control input from the inner-loop controller and providing an actual virtual control input; and providing a plant, the plant receiving the actual virtual control input from the at least one actuator and providing an updated performance variable value to the outer-loop controller;

wherein the inner-loop controller also minimizing a cost function in real time in order to generate the real control input, the cost function being a function of the desired virtual input and said actual virtual control input; and the at least one actuator provides the plant a disturbance, the disturbance equal to the difference between actual virtual control input and the desired virtual control input.

16. The method of claim 15, wherein the inner-loop controller uses model predictive control allocation to provide the real control input to the at least one actuator.

17. The method of claim 16, wherein the model predictive control allocation computes an optimal trajectory of candidate real control inputs in real time over a receding horizon.

* * * * *